No. 618,098. Patented Jan. 24, 1899.
L. P. HOPKINS.
WEEDER.
(Application filed June 3, 1898.)
(No Model.) 2 Sheets—Sheet 1.
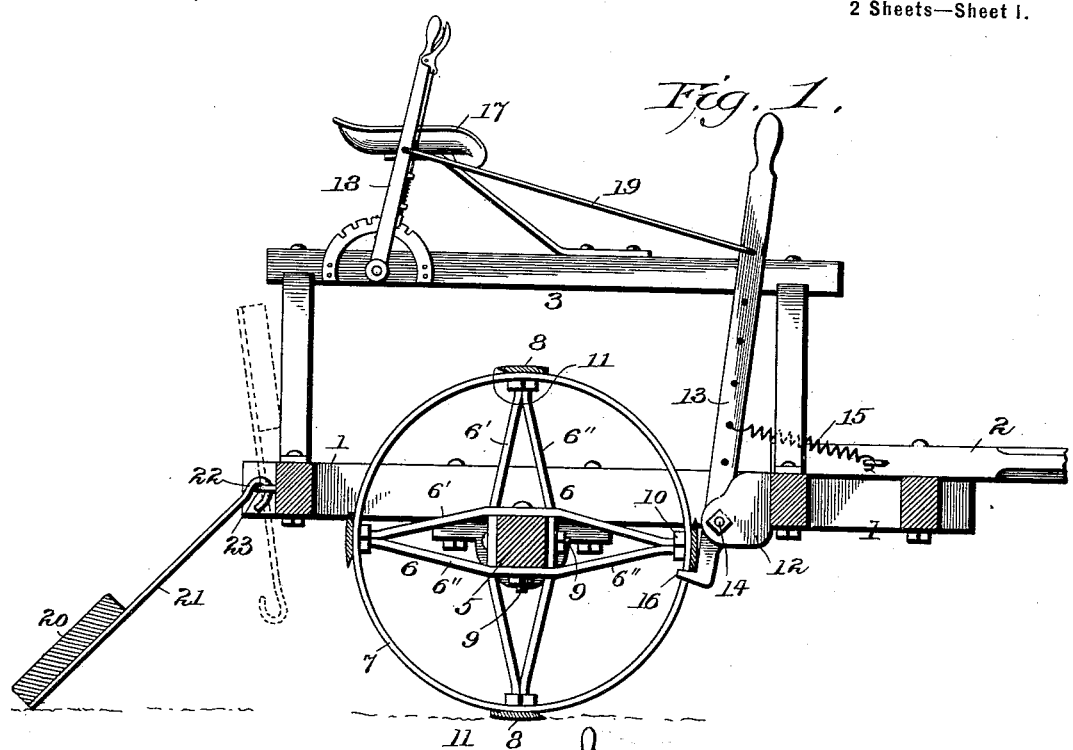
Witnesses
Inventor
Liston P. Hopkins
By Henry N. Copp
Attorney No. 618,098. Patented Jan. 24, 1899.
L. P. HOPKINS.
WEEDER.
(Application filed June 3, 1898.)
(No Model.) 2 Sheets—Sheet 2.

Witnesses
Inventor
Liston P. Hopkins.
By Henry N. Copp
Attorney

UNITED STATES PATENT OFFICE.

LISTON P. HOPKINS, OF ROSEDALE, OREGON.

WEEDER.

SPECIFICATION forming part of Letters Patent No. 618,098, dated January 24, 1899.

Application filed June 3, 1898. Serial No. 682,467. (No model.)

*To all whom it may concern:*

Be it known that I, LISTON P. HOPKINS, a citizen of the United States, residing at Rosedale, in the county of Marion and State of Oregon, have invented certain new and useful Improvements in Weeders; and I do hereby declare the following to be a full, clear, and exact description of the invention, such as will enable others skilled in the art to which it appertains to make and use the same.

My invention relates to weeders, and has for its objects the provision of novel weed-cutting mechanism adapted to sever the weeds in an improved manner and designed for self-cleaning, an improved clod-crusher especially adapted for use in connection with the weed-cutting mechanism, and generally to improve upon machines of this class, whereby a more simple, inexpensive, and efficient device is provided.

Having the foregoing objects in view, the invention consists of certain improvements and novel combinations of parts, more fully set forth hereinafter and recited in the appended claims.

Figure 3:
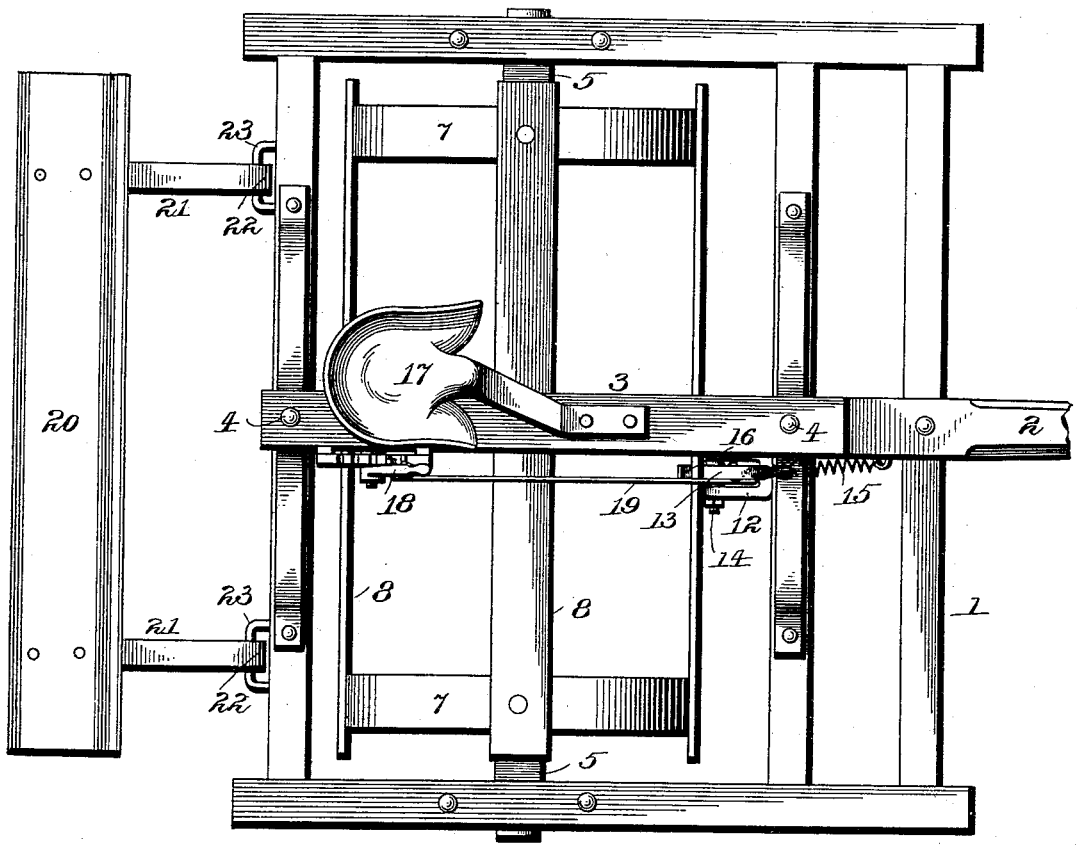
Figure 4:
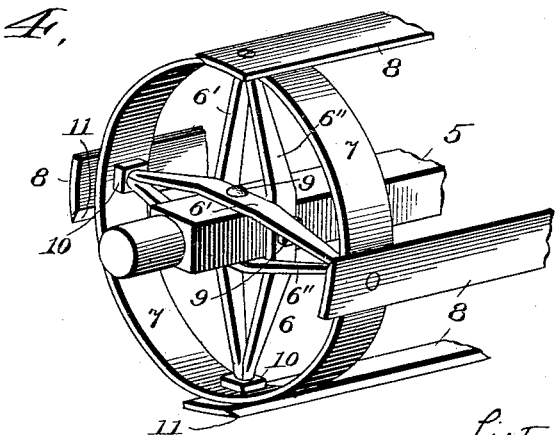

In the accompanying drawings, Figure 1 is a sectional side elevation; Fig. 2, a rear elevation; Fig. 3, a plan view; and Fig. 4, a detail of a portion of the cutting-cylinder, showing the construction and connection of the braces.

The main frame is shown at 1, it being equipped with the usual draft-tongue 2.

The numeral 3 designates a supplemental frame, comprising a beam which extends longitudinally of the main frame and inclined braces, and bolts 4, which rise from the cross-beams of the main frame. The supplemental frame, besides affording a support for the driver's seat and certain mechanism described hereinafter, constitutes a brace for the main frame and prevents damage thereto by reason of the strain caused by the clod-crusher, to be described presently, when in use.

My improved cutting-cylinder is located within the main frame and under the supplemental frame, and it consists of an axle 5, journaled in the main frame, braces 6, connected to the axle, hoops 7, connected to the braces, and the cutter-bars 8, fastened to the hoops. The axle is in the present instance constructed of wood for the sake of cheapness and lightness and is square in cross-section. The remaining parts of the cylinder are of metal. There are two double braces for each hoop, and the hoops are disposed at regular intervals along the length of the cylinder. These braces are each composed of two members 6' 6", which embrace the axle on opposite sides and are secured thereto by bolt 9 and have their ends brought together and held by nuts 10 and passed through and secured to the hoops and cutter-bars by being riveted down on the latter. The braces of each hoop, it will be observed, are disposed at right angles to each other, as are also the bolts which fasten them to the axle, in consequence of which the hoops and the entire cutting-cylinder are braced in a most satisfactory manner, and splitting the axle by reason of the strain thereon is prevented. The cutter-bars are disposed parallel to each other and at right angles to the hoops, and each has one longitudinal edge 11 sharpened. Besides constituting a cutting-cylinder, this structure serves as a broad traction-wheel for the machine. When one edge of the cutter-bars becomes dulled by use, the cylinder can be removed from its bearings, the other edges of the cutter-bars sharpened, and the cylinder can then be replaced in reversed arrangement.

Mechanism is employed for locking the cylinder, which consists of a boxing 12, secured to one of the front cross-beams of the main frame, a locking-lever 13, pivoted in the boxing on a bolt 14, and a coil-spring 15, extending from the lever to the draft-tongue, which keeps the lower or locking end of the lever normally thrown rearwardly, a finger 16 at the lower end of the lever being in position to engage the edge of any one of the cutter-bars. The upper end of the locking-lever is disposed adjacent to the usual driver's seat 17, so that the lever can be easily retracted when it is desired to unlock the cutting-cylinder and allow the same to rotate to dump or clear itself of its accumulation of cut weeds, rubbish, &c.

Near the rear of the supplemental frame is a hand-lever 18, which is pivoted to said frame and is connected to the locking-lever by a rod 19, this hand-lever being used for the retraction of the locking-lever when the operator is riding on the clod-crusher, now to be described.

The clod-crusher consists of a flat body 20 of approximately the width of the cylinder, and flat hangers 21, secured thereto, which have hook ends 22, which are loosely engaged with hinge members 23, secured to the rear cross-beam of the main frame. The clod-crusher when in use hangs down freely from the main frame, so that it is adapted to rise and fall to accommodate itself to the inequalities of the clods and ground which it encounters. When this clod-crusher is not in use, it can be raised and shipped by sliding the hangers through the hinge members, as shown by dotted lines in the drawings.

The present invention is designed for severing and uprooting weeds in ground which has already been plowed and harrowed, so that the cutter-bars can travel somewhat under the surface.

Ordinarily the cutting-cylinder is locked by the locking-lever and only one of the cutter-bars is then lowermost. As the machine advances this cutter-bar passes along slightly under the surface of the ground, severing and uprooting the weeds and rubbish, parts of which will of course pass into the cylinder, although the greater part will pass through the latter. When the accumulation in the cylinder becomes too great, the locking-lever is retracted, whereupon the cylinder will begin to rotate, and the accumulation being carried rearward and upward in the cylinder will gravitate down and, becoming loosened, fall out through the spaces in the cylinder and be deposited on the ground. As soon as the cylinder is cleared the locking-lever is released and again locks the cylinder, and the cutting operation is continued. When the clod-crusher is used, the driver stands thereon in order to give it sufficient weight to properly demolish the clods, and when it is employed the hand-lever, being within easy reach of the driver, is used for the retraction of the locking-lever.

The supplemental frame acting as a brace for the main frame prevents the dragging strain exerted on the latter by the clod-crusher when in use from causing damage to it.

Having thus described my invention, what I claim as new, and desire to secure by Letters Patent, is—

1. In a weeder, the combination with a machine-frame, of a rotary cutting-cylinder having tangentially-disposed knives and serving as a wheel or roller for supporting said frame, and mechanism coacting with said cylinder to hold it normally locked with one of the said knives lowermost and in position for cutting whereby the weight of the machine will cause the knives to travel below the surface of the ground passed over.

2. In a weeder, the combination with a skeleton cutting-cylinder composed of an axle, separated hoops connected thereto, and a plurality of cutter-bars extending longitudinally of the cylinder and connected to the hoops in separated arrangement, said cylinder being adapted for rotation when free, of releasable mechanism adapted for locking the cylinder against rotation.

3. In a weeder, the combination with a skeleton cutting-cylinder composed of an axle, braces connected thereto at different points, hoops connected to the respective braces, and a plurality of cutter-bars connected to the hoops and extending longitudinally thereof, being disposed at different points on the peripheries of the hoops, of a locking-lever adapted for engagement with any one of the cutter-bars, whereby to lock the cylinder against rotation, said cylinder being adapted for rotation when disengaged from said lever.

4. In a weeder, a weed-cutting cylinder having an axle, a hoop, and with double braces, disposed with their axes inclined in relation to each other, each consisting of two members which are disposed on opposite sides of the axle and connected thereto by a bolt passing through them and through the axle.

5. In a weeder, a weed-cutting cylinder comprising an axle, a plurality of hoops, cutter-bars extending from hoop to hoop, and sets of braces for the hoops, each brace consisting of two members which straddle the axle and are connected thereto by bolts and have their ends secured to the hoop and to the cutter-bars, said braces of each set and the bolts that connect them to the axle being disposed at an angle to each other.

6. In a weeder, the combination with a machine-frame, of a cutting-cylinder journaled thereto which is adapted for rotation when free, a locking-lever for securing the cylinder, a hand-lever connected to the locking-lever and located at the rear of the machine, and a clod-crusher at the rear of the machine, adjacent to the hand-lever.

In testimony whereof I affix my signature in presence of two witnesses.

LISTON P. HOPKINS.

Witnesses:
J. S. COOK,
A. L. COOK.